(12) United States Patent
Chen

(10) Patent No.: US 7,459,629 B2
(45) Date of Patent: Dec. 2, 2008

(54) EXTENSION BOX OF STORAGE MEDIA

(75) Inventor: Po-Hung Chen, Diamond Bar, CA (US)

(73) Assignee: Macpower & Tytech Technology Co., Ltd., Hsintien, Taipei (TW)

( * ) Notice: Subject to any disclaimer, the term of this patent is extended or adjusted under 35 U.S.C. 154(b) by 436 days.

(21) Appl. No.: 11/298,539

(22) Filed: Dec. 12, 2005

(65) Prior Publication Data

US 2006/0130082 A1    Jun. 15, 2006

(30) Foreign Application Priority Data

Dec. 13, 2004    (TW) .............................. 93220038 U

(51) Int. Cl.
*H02G 3/08* (2006.01)
(52) U.S. Cl. .................. 174/50; 174/559; 174/520; 174/548; 361/683; 361/679; 361/687
(58) Field of Classification Search .................. 174/50, 174/53, 57, 17 R, 17 VA, 520, 547, 548, 559, 174/59; 220/3.2–3.9, 4.02; 361/600, 676, 361/678, 679, 683–689
See application file for complete search history.

(56) References Cited

U.S. PATENT DOCUMENTS

| 5,402,308 | A  | * | 3/1995  | Koyanagi et al. | 361/685 |
| 5,668,697 | A  | * | 9/1997  | Dowdy           | 361/685 |
| 5,886,869 | A  | * | 3/1999  | Fussell et al.  | 361/685 |
| 6,304,440 | B1 | * | 10/2001 | Lin             | 361/685 |
| 6,560,099 | B1 | * | 5/2003  | Chang           | 361/685 |
| 6,657,858 | B2 | * | 12/2003 | Rothschild      | 361/685 |
| 6,741,467 | B2 | * | 5/2004  | Coglitore et al.| 361/687 |
| 2006/0198099 | A1 | * | 9/2006 | Chapel          |         |

* cited by examiner

*Primary Examiner*—Angel R Estrada
(74) *Attorney, Agent, or Firm*—Bacon & Thomas, PLLC

(57) ABSTRACT

The invention discloses an extension box of storage media, which mainly utilized a plurality of heat dissipation fins protruding from a bottom surface of a bottom shell of the extension box. The heat dissipation fins efficaciously dissipate heat from the storage media, so it improves the dissipation heat efficiency and reduces breakdown for the storage media. The extension box of storage media of the present invention is electrically connected with an external electronic apparatus by a universal series bus (USB) or an IEEE 1394 interface connector for transmitting a data.

7 Claims, 3 Drawing Sheets

EXTENSION BOX OF STORAGE MEDIA

BACKGROUND OF THE INVENTION

1. Field of the Invention

The present invention relates to an extension box and, more particularly, to an extension box of storage media.

2. Description of Related Art

Recently, according to the fast development of the technology, people must have the action ability to promote their competition, and the notebooks would be the first choice, because the notebook computers have the feature of portability.

The notebook computers recently have been trended to replace the desktop computers. The recent notebook computers are designed having their storage medias detachable, for example, the hard disk drivers, the floppy disk drivers, the CD-ROM drivers, and etc., for the purpose of portability. By the aforesaid ways, the notebook computers could be smaller size and lighter weight when taking out.

The storage medias of the notebooks must use the extension boxes to accommodate them when the storage medias of the notebooks use the external modes. The extension boxes of the prior art do not comprise other functions but accommodated the storage medias, especially without the heat dissipation function. When the storage medias are working and dissipating heat, the dissipated heat energy of the storage medias have no outlet to dissipate. Therefore, the dissipated heat energy of the storage medias causes the damage of storage medias; moreover, cause the inconvenient in using.

Therefore, it is desirable to provide an improved speech recognition method to mitigate and/or obviate the aforementioned problems.

SUMMARY OF THE INVENTION

The extension box of storage media of the present invention comprises a bottom shell, a top shell, and a plurality of interface connectors. The bottom shell comprises at least one lateral panel and a bottom panel. The top shell covered onto the bottom shell and formed with the bottom shell therebetween an internal chamber for receiving a storage media therein. The interface connectors mounted on the at least one lateral panel of the bottom shell and electrically connected between the storage media and an external electronic apparatus. Wherein, the bottom shell further comprises a plurality of heat dissipation fins, the heat dissipation fins downwardly protruded from a bottom surface of the bottom panel of the bottom shell. Therefore, when the storage media is accommodated in the internal chamber and in working, the aforesaid structure of the present invention can dissipate the heat energy produced from the storage media in efficiency, so as to prevent the breakdown condition of the storage media.

The bottom surface of the bottom panel of the bottom shell further comprises a plurality of protrusions, the top shell further comprises a plurality of folding plates downwardly inwardly extended in two opposite sides thereof and respectively corresponding to the protrusions of the bottom shell for engagement.

The interface connectors comprise at least one universal series bus (USB) interface connector, or at least one IEEE 1394 interface connector, or other interface connectors having the same function.

The interface connectors electrically connected between the storage media and the external electronic apparatus such as notebooks, tablet computer, or etc.

The top shell laterally sleeved to the bottom shell for engagement.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
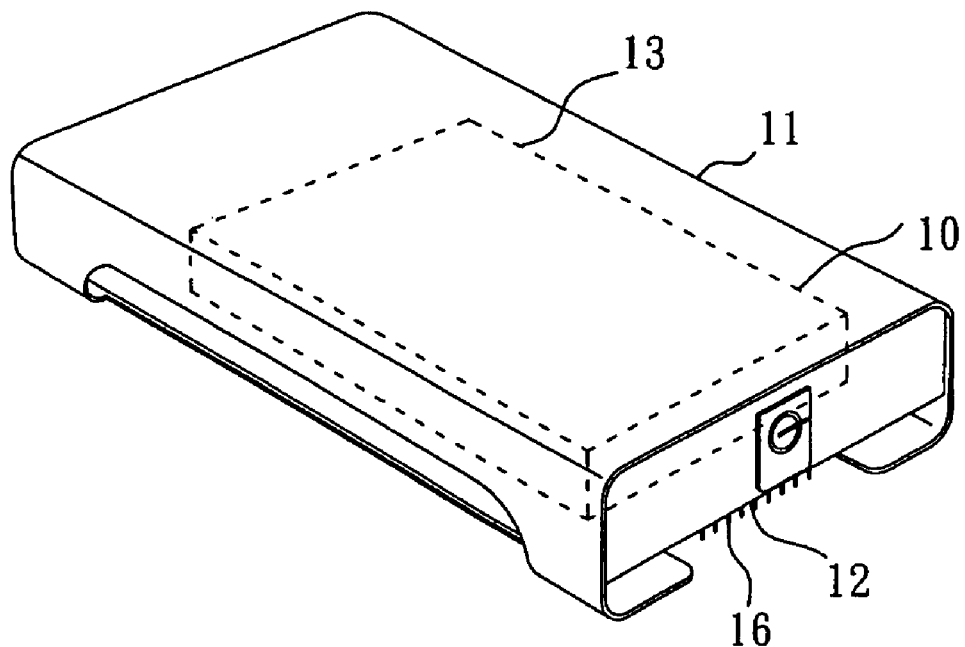
FIG. 1 is a perspective view of one preferred embodiment according to the present invention.
Figure 2:
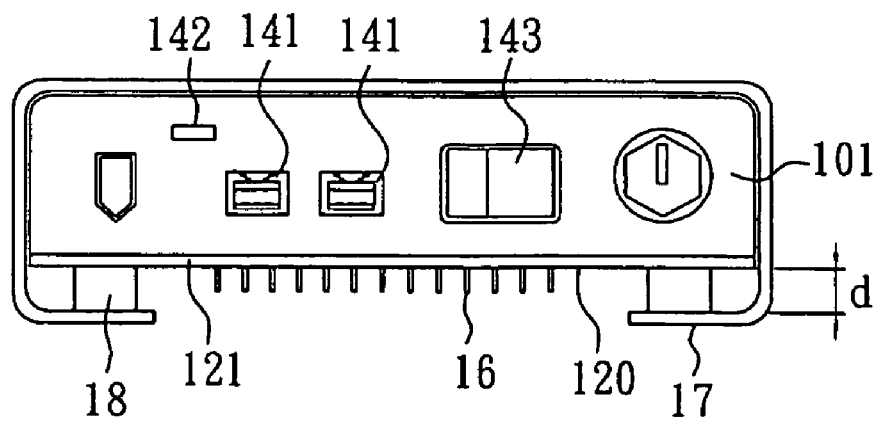
FIG. 2 is a lateral view of the preferred embodiment according to the present invention.

Please refer to FIG. 1 and FIG. 2. FIG. 1 is a perspective view of one preferred embodiment according to the present invention, and FIG. 2 is a lateral view of the preferred embodiment according to the present invention. An extension box of storage media 10 comprises a top shell 11, a bottom shell 12, two USB interface connectors 141, an IEEE 1394 interface connector 142, a power supply interface connector 143, and a plurality of heat dissipation fins 16. The top shell 11 covered onto the bottom shell 12 and formed with the bottom shell 12 therebetween an internal chamber 13 for receiving a storage media therein. In this embodiment, the top shell 11 laterally sleeves onto the bottom shell 12 for engagement. The bottom shell 12 comprises at least one lateral panel 101 and a bottom panel 121. In this embodiment, the bottom panel 121 is made of a metal material for heat conduction. The heat dissipation fins 16 downwardly protrude from a bottom surface 120 of the bottom panel 121 of the bottom shell 12. The bottom surface 120 of the bottom panel 121 of the bottom shell 12 further comprises four protrusions 18. The top shell 11 further comprises four folding plates 17 downwardly inwardly extended in two opposite sides thereof and respectively corresponding to the protrusions 18 of the bottom shell 12 for engagement. By the design of the protrusions 18 and the folding plates 17, the bottom surface 120 of the bottom panel 121 will separate a distance d from the folding plates 17, therefore, the heat dissipation fins 16 are shorter than the distance d and will not be damaged by external element such as a top surface of a table when the heat dissipation fins 16 were downwardly protruded from the bottom surface 120 of the bottom panel 121 of the bottom shell 12.

Figure 3:
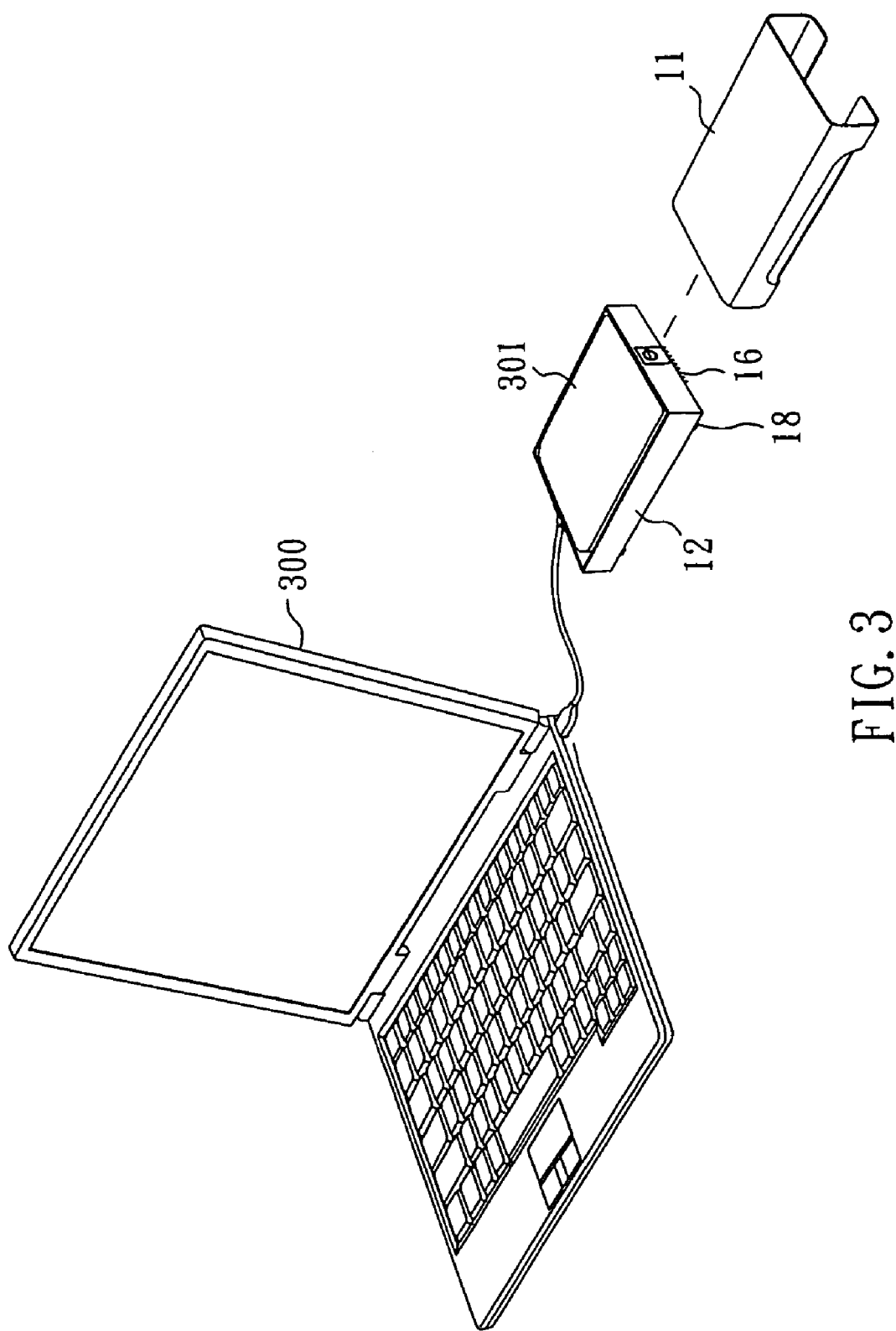
FIG. 3 is a diagram of the operation of the preferred embodiment according to the present invention.

Please refer to FIG. 3 and FIG. 1 and FIG. 2 again, in this embodiment, the extension box of storage media 10 is accommodated a 5.25-inch sized CD-ROM drive 301. When a user wants to use the CD-ROM drive 301, the power supply interface connector 143 of the lateral panel 101 is connected to a power source and the power source is switched on. After the power source was switched on, the extension box of storage media 10 is connected to an external electronic apparatus by the USB interface connectors 141 or the IEEE 1394 interface connector 142 via an electrical wire. In this embodiment, the external electronic apparatus is a notebook computer 300. The extension box of storage media 10 is electrically connected to the notebook computer 300 through the USB interface connectors 141, and then data will be mutually transmitted between the extension box of storage media 10 and the notebook computer 300.

As mentioned, the heat dissipation fins 16 were downwardly protruded from the bottom surface 120 of the bottom panel 121 of the bottom shell 12. Therefore, the heat dissipation fins 16 can dissipate the heat energy produced by the storage media in efficiency when the storage media is accommodated in the internal chamber 13 and is working, so as to prevent the breakdown condition of the CD-ROM drive 301.

Figure 4:
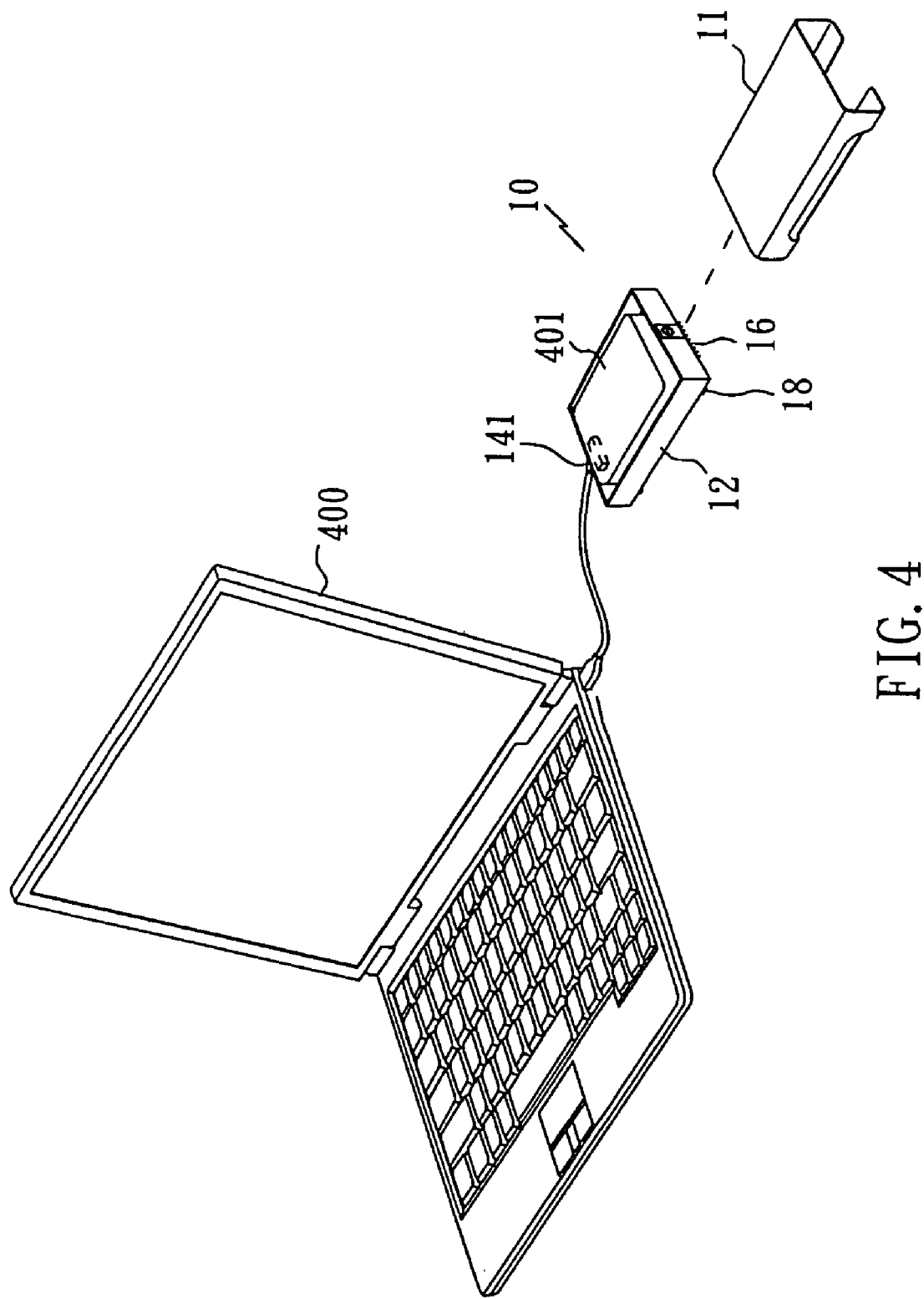
FIG. 4 is a diagram of the operation of another preferred embodiment according to the present invention.

The capacity of one hard disk driver 401 is usually not enough when the notebook computer 400 accesses a huge volume data. The notebook computer 400 can be connected to an external hard disk driver for expanding its storage capacity; otherwise the hard disk driver 401 in the notebook computer 400 will be changed for a new hard disk driver with a larger capacity. Please refer to FIG. 4. The extension box of storage media 10 is accommodated a 3.25-inch sized hard disk driver 401 therein. The extension box of storage media 10 electrically connects with a notebook computer 400 through the USB interface connectors 141, so the notebook computer 400 accesses the data of the hard disk driver 401 through the USB interface connectors 141.

With the dissipation structure of the present invention, when the hard disk driver 401 is working, the heat dissipation fins 16 can dissipate the heat energy produced by the 3.25-inch sized hard disk driver 401 in efficiency, so as to prevent the breakdown condition of the hard disk driver 401.

Although the present invention has been explained in relation to its preferred embodiment, it is to be understood that many other possible modifications and variations can be made without departing from the scope of the invention as hereinafter claimed.

What is claimed is:

1. An extension box of storage media, comprising: a bottom shell, said bottom shell comprising at least one lateral panel and a bottom panel;

a top shell, said top shell covered onto said bottom shell and formed with said bottom shell therebetween an internal chamber for receiving a storage media therein;

and a plurality of interface connectors, said interface connectors mounted on the at least one lateral panel of said bottom shell and electrically connected between said storage media and an external electronic apparatus;

wherein, said bottom shell further comprising a plurality of heat dissipation fins, said heat dissipation fins downwardly protruded from a bottom surface of the bottom panel of said bottom shell; and wherein the bottom surface of the bottom panel of said bottom shell further comprises a plurality of protrusions, said top shell further comprises a plurality of folding plates downwardly inwardly extended in two opposite sides thereof and respectively corresponding to the protrusions of said bottom shell for engagement.

2. The extension box of storage media as claimed in claim 1, wherein the interface connectors comprise at least one universal series bus (USB) interface connector.

3. The extension box of storage media as claimed in claim 1, wherein the interface connectors comprise at least one IEEE 1394 interface connector.

4. The extension box of storage media as claimed in claim 1, wherein the interface connectors comprise a power supply interface connector.

5. The extension box of storage media as claimed in claim 1, wherein said extension box is accommodated a 5.25-inch sized storage medium therein.

6. The extension box of storage media as claimed in claim 1, wherein said extension box is accommodated a 3.5-inch sized storage medium therein.

7. The extension box of storage media as claimed in claim 1, wherein said top shell laterally sleeved to said bottom shell for engagement.

* * * * *